United States Patent
Horigan et al.

(10) Patent No.: US 6,304,978 B1
(45) Date of Patent: Oct. 16, 2001

(54) METHOD AND APPARATUS FOR CONTROL OF THE RATE OF CHANGE OF CURRENT CONSUMPTION OF AN ELECTRONIC COMPONENT

(75) Inventors: John W. Horigan, Mountain View, CA (US); Rex C. Peairs, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/199,891

(22) Filed: Nov. 24, 1998

(51) Int. Cl.[7] .............................. G06F 1/26; G06F 1/28; G06F 1/30

(52) U.S. Cl. .................... 713/322; 713/300; 713/310; 713/320; 713/330; 713/340

(58) Field of Search ...................................... 713/300–340

(56) References Cited

U.S. PATENT DOCUMENTS

| | | | |
|---|---|---|---|
| 5,546,568 | * 8/1996 | Bland et al. | 713/501 |
| 5,586,332 | * 12/1996 | Jain et al. | 713/322 |
| 5,719,800 | * 2/1998 | Mittal et al. | 713/321 |
| 5,875,120 | * 2/1999 | Matsushima et al. | 364/707 |
| 5,954,819 | * 9/1999 | Kenny et al. | 713/322 |
| 6,105,142 | * 8/2000 | Goff et al. | 713/324 |

* cited by examiner

Primary Examiner—Rupal Dharia
(74) Attorney, Agent, or Firm—Jeffrey S. Draeger

(57) ABSTRACT

A method and apparatus which may be used for control of the rate of change of current consumption of an electronic component. The apparatus includes a processing circuit having coupled to receive a throttling signal that throttles operation of the electronic component. The apparatus also includes a power management circuit which detects a power consumption change of the processing circuit generates the throttling signal in response to the power consumption change event.

25 Claims, 4 Drawing Sheets

METHOD AND APPARATUS FOR CONTROL OF THE RATE OF CHANGE OF CURRENT CONSUMPTION OF AN ELECTRONIC COMPONENT

BACKGROUND OF THE INVENTION

1. Field of the Invention

The present invention pertains to the field of controlling power consumption in a system such as a computer system. More particularly, the present invention pertains to controlling the rate of change of current consumption for one or more electronic devices.

2. Description of Related Art

By controlling or limiting the rate of change of current consumption for an electronic device, one may advantageously reduce the cost and/or size of the power supply required to operate that device. In fact, the ability of a power supply to respond to instantaneous or rapid changes in power demand is a significant constraint on the design of the power supply. As a result, a large and/or expensive power supply may be necessary if the system requires the power supply to respond very quickly to large changes in current demand.

Additionally, as microprocessors and other electronic components provide new features and/or process larger quantities of data, power consumption typically rises, further burdening power supplies. Numerous power saving techniques combat this general tendency of increased power consumption. For example, as semiconductor processing technologies advance, smaller transistors which consume less power may be used. components may also include logic dedicated to reducing power consumption. For example, some microprocessors include pins such as stopclock pin which (when asserted) stops the clock of the processor or a portion thereof. Toggling such pins may dramatically change the power consumption of the processor in a relatively short order of time.

Another technique known in the art is clock gating. Clock gating generally refers to disabling the clock signal(s) to a portion of a processor or other electronic component in which no activity is occurring. Stopping the clock(s) for such inactive portions saves power without impacting performance because clocks are again enabled when the disabled portion of the component is needed. Relatively large portions of a component may have gated clocks, therefore clock gating also can dramatically impact power consumption in a very short order of time.

Thus, at least stopclock pin assertion and clock gating can advantageously cause dramatic power savings by quickly reducing unnecessary power consumption. Unfortunately, these power saving measures place additional constraints on power supply designs due to the often sizable and rapid changes in current involved. Nonetheless, power supplies typically need to tolerate such rapid and dramatic changes in current consumption while remaining within a specified voltage range. As a result, power supplies may be unnecessarily large and/or expensive. Controlling the rate of change of current consumption of electronic components or portions thereof may allow systems to operate using power supplies with less stringent specifications, potentially reducing cost and/or size.

SUMMARY

A method and apparatus which may be used for control of the rate of change of current consumption of an electronic component is disclosed. The apparatus includes a processing circuit having coupled to receive a throttling signal that throttles operation of the electronic component. The apparatus also includes a power management circuit which detects a power consumption change of the processing circuit generates the throttling signal in response to the power consumption change event.

BRIEF DESCRIPTION OF THE FIGURES

The present invention is illustrated by way of example and not limitation in the figures of the accompanying drawings.

DETAILED DESCRIPTION

The following description provides a method and apparatus for control of the rate of change of current consumption of an electronic component. In the following description, numerous specific details such as signal or interface node names, duty cycles, and logic partitioning/integration choices are set forth in order to provide a more thorough understanding of the present invention. It will be appreciated, however, by one skilled in the art that the invention may be practiced without such specific details. In other instances, control structures and gate level circuits have not been shown in detail in order not to obscure the invention. Those of ordinary skill in the art, with the included descriptions, will be able to implement the necessary logic circuits without undue experimentation.

The disclosed method and apparatus may advantageously ease constraints on power supply designs by reducing the rate at which the power supply is required to ramp (i.e., increase) current. By throttling the activity of a processing circuit during the time an abrupt change in current would otherwise occur, some embodiments limit the rate of change of current demand of the component containing the processing circuit. As a result, the power supply for such component need not contend with such sharp changes in current demand and accordingly may be designed in a smaller and/or more cost effective manner.

Smaller, and especially shorter, power supplies may be important in continuing to shrink portable computing platforms such as laptop or notebook computers. Such smaller supplies may be possible using the disclosed techniques to limit current demands on the power supply. Also, reducing the rate of change of current may be crucial to high performance systems where very high performance processors consume much larger quantities of power than mobile processors (i.e., processors designed for mobile, portable, or otherwise battery powered devices). Such high performance processors place even larger demands on power supplies than mobile processors since enabling and disabling such processors results in more dramatic changes in current.

Figure 1:
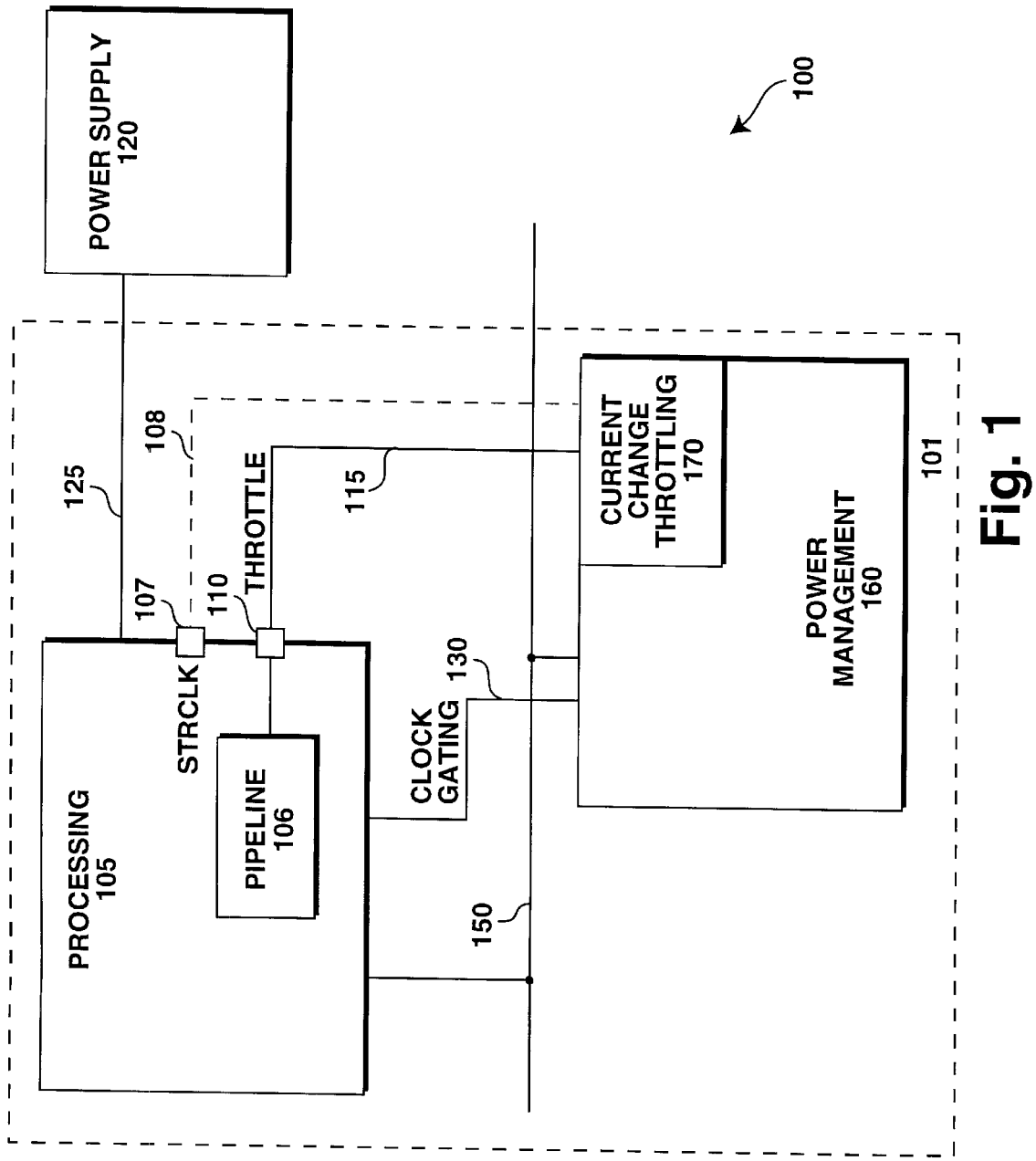
FIG. 1 illustrates one embodiment of a system which controls the rate of change of current consumption of a processing circuit.

FIG. 1 illustrates a system 100 in which the rate of change of current consumption of an processing circuit 105 is limited, reduced, or otherwise controlled by a power management circuit 160. The system may be a computer system such as a notebook, laptop, desktop, server, or other type of processing or computer system. The processing circuit may be a component or circuit such as a digital signal processor, a general purpose processor, a special purpose processor, or another component or portion thereof which may have substantial and rapid changes in current demand and may be capable of throttling operations. In some embodiments, the processing circuit 105 and the power management circuit 160 may be integrated into a single integrated circuit or a single component as indicated by the dashed block 101.

The processing circuit 105 and the power management circuit 160 are coupled to a bus 150. A power supply 120 provides power to the processing circuit 105 over a power supply line 125. To compensate for the limited ability of the power supply 120 to increase the amount of current supplied to the processing circuit 105 in a given period of time, the power management circuit 160 throttles operation of the processing circuit 105 by sending a throttle signal on a signal line 115 to a throttling pin 110 on the processing circuit 105. The component responsively slows operations when the throttling pin is asserted, thereby reducing the rate of current consumption.

The power management circuit 160 may monitor the bus (e.g., any appropriate internal or external signals) for events which would trigger an awakening or an increase in the processing performed by the processing circuit 105. For example, a computer system which is inactive for a period of time may assert a stopclock signal to its processor. When a key is pressed, the mouse moved, or other input stimulus received, the power management circuit 160 may detect this input and not only deassert the stopclock, but also begin asserting a throttle signal on a signal line 115. Any such events which change the power consumption state of the system may be detected by the power management circuit 160 and may trigger throttling of the processing circuit 105.

In one embodiment, a current change throttling circuit 170 asserts and deasserts the throttle signal starting with a certain duty cycle (defined as the percentage of time the throttle signal is asserted). The initial duty cycle may be a function of the processing circuit power consumption state as well as the nature or type of event which occurred. For example, if the processing circuit 105 is a microprocessor which is largely shut down due to the assertion of a stopclock signal on a stopclock input pin 107, a major change in current is likely when the stopclock signal is deasserted. Such a large change in current may initially require a high duty cycle to adequately slow the rate of change of current.

Additionally, the total duration which the throttle signal is toggled may be a function of the processing circuit power consumption state and/or the type of event which occurred. In some embodiments, the duty cycle of the throttle signal is reduced from a high duty cycle to zero percent in order to slowly ramp the current consumption of the processing circuit 105. For example, the duty cycle may begin at seventy-five percent and may be reduced to twenty-five percent before the throttle signal is completely deasserted. Other starting and ending duty cycles may be selected, and the transition may be slow or rapid and in few or numerous steps, depending on the capabilities of the power supply and the demands of the processing circuit.

The throttle signal may enter the processing circuit 105 via a throttle pin 110 in some embodiments. The throttle signal causes operation of the processing circuit to slow. In some embodiments, the throttle signal controls a stage of a pipeline 106 (e.g., preventing instructions from retiring or preventing instructions from entering the pipeline). By slowing the pipeline of the processing circuit 105, the throttle signal remains transparent from a functional perspective to the remainder of the system. That is, since the processing circuit performs the same high level functions, albeit slower, the remainder of the system is largely unaffected and/or unaware of the assertion and deassertion of the throttle signal.

Throttling the operation of the processing circuit 105 by stalling the pipeline limits the change in current because it stops the flow of instructions and therefore prevents portions of the processing circuit from being activated. In a processing circuit utilizing clock gating, stalling the pipeline typically causes the clock gating circuitry to disable clocks to unused portions, further reducing the current demand. Additionally, a pipeline stall can quickly halt (and conversely removing the stall can quickly restart) processing throughout a processing circuit such as a processor. Thus, processing circuit current consumption can be effectively modulated via a periodic or varying duty cycle throttle signal which stalls the pipeline.

In an alternative embodiment, an additional pin or interface node for throttling operation of the processing circuit 105 may not be available. In this case, the power management circuit may ease rapid power consumption changes by periodically asserting and deasserting the stopclock pin 107 (connected by dotted line 108 to the power management circuit 160) to slowly increase the power consumption of the processing circuit. Unlike assertion of the throttle signal, assertion of the stopclock signal is not transparent to the system in many microprocessors since special cycles may be run to the bus and/or processor state saves may be performed. Nonetheless, stopclock may be used to throttle the current ramp if a dedicated signal which provides functionally transparent throttling is not available.

The stopclock signal is toggled in a similar manner to throttle signal. For example, the power management circuit 160 may begin with a high duty cycle of stopclock signal being asserted and gradually transition to a state where stopclock is completely deasserted. As is also true of the throttle signal, the rate of change of the duty cycle of the stopclock signal depends on the capabilities of the power supply 120 and the current consumption characteristics of the processing circuit 105.

In some embodiments, an optional additional feature improves control over the rate of change in current consumption for processing circuits which perform internal clock gating or other typically internal power saving techniques. In such embodiments, a signal line(s) 130 between the processing circuit 105 and the power management circuit 160 provides additional information to assist the power management circuit 160 in properly throttling the activity of the processing circuit. For example, the signal line(s) 130 may carry a clock gating signal from the processing circuit 105 to the power management circuit 160. This signal may indicate either that one or more particular clocks are being gated and/or may give a relative indication of the change in current consumption expected. With this information, the power management circuit 160 gains insight into events internal to the processing circuit 105 which could also cause significant swings in current demand for the processing circuit 105.

Other internal current change estimates maybe conveyed to the power management circuit 160 to allow control of the rate of change of current even if the signals lag the transition to a new power consumption mode (e.g., the clock gating is stopped before or as the power management circuit 160 is so informed). In this case, the power management circuit 160 may begin throttling the processing circuit 105 after a transition to a new power consumption level but before the power supply 120 and processing circuit 105 have fully adjusted to the new power consumption level. Thus, a reactive throttling response may also effectively in control the rate of change of current consumption.

In some embodiments, the power management circuit 160 may be coupled to other system components in a different fashion. For example, one well known computer system configuration includes the use of a processor bus with a processor bus bridge (i.e., a north bridge) coupling the processor and processor bus to a Peripheral Components Interconnect (PCI) bus. The PCI bus is coupled to a secondary bus by a second bridge (i.e., a south bridge). The south bridge or components attached to the secondary bus often handle power management tasks. Accordingly, the illustrated power management circuit 160 may in various embodiments either be coupled to the secondary bus or integrated into the south bridge.

Figure 2:
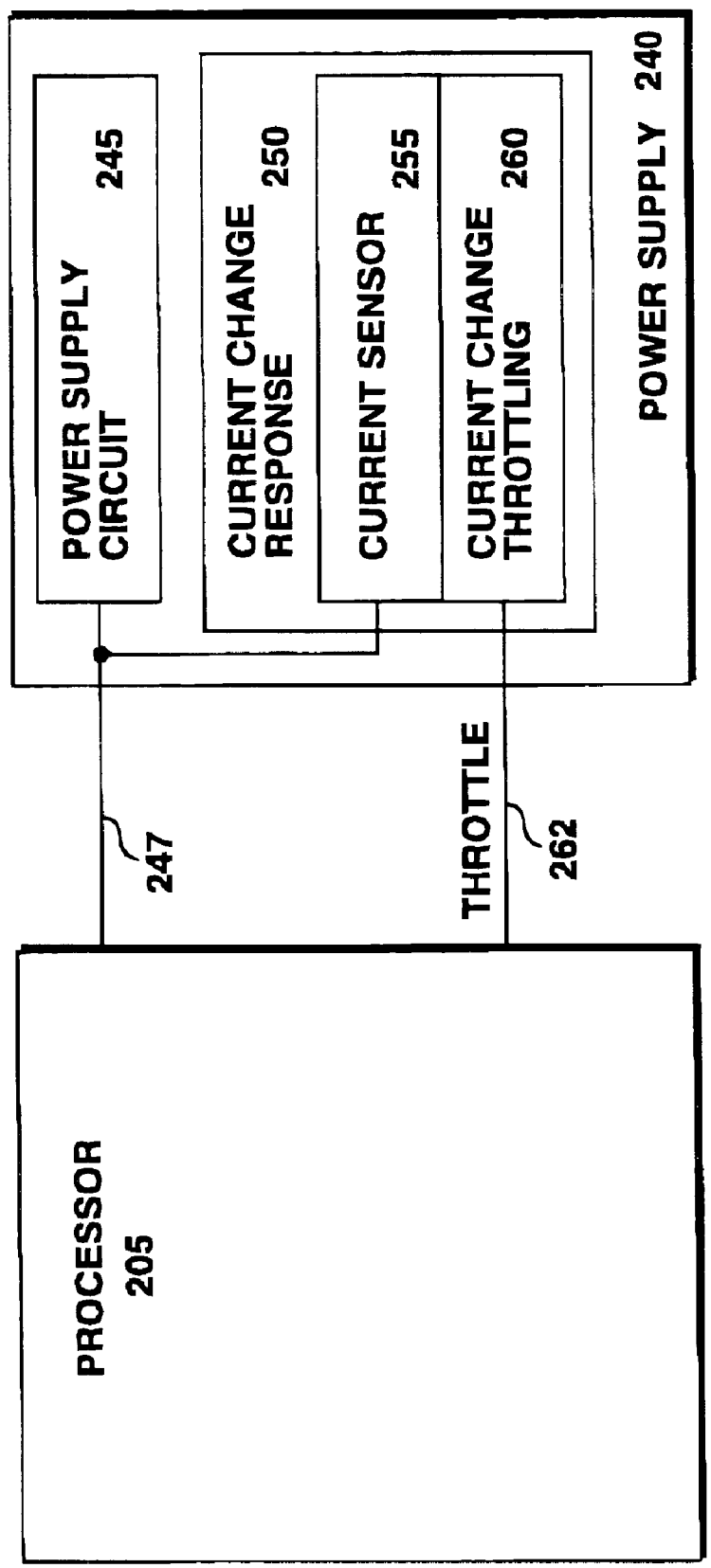
FIG. 2 illustrates another embodiment of a system which controls the rate of change of current using a current sensor which may be a part of a system power supply.

FIG. 2 also illustrates an embodiment having a power management circuit which detects a power consumption change and responsively throttles an electronic component. The embodiment of FIG. 2 advantageously allows the throttling of the processor 205 to compensate for techniques such as clock gating which are entirely internal to the processor 205. Instead of relying on system level signals which signify power consumption change events, the embodiment of FIG. 2 directly monitors the current supplied to the processor 205 and/or system for abrupt changes.

The embodiment illustrated in FIG. 2 utilizes a power supply 240 having a current change response circuit 250. In some embodiments, the current change response circuit 250 may be located separately from the power supply 240 and/or integrated into other system components such as the processor 205. Power is provided from a power supply circuit 245 to a processor 205 via a power supply line 247. The current change response circuit 250 generates a throttle signal on a signal line 262 to throttle the processor 205 when a change in current supplied exceeds a threshold value. Accordingly, the rate of current change may be controlled.

In the illustrated embodiment, the current change response circuit 250 includes a current sensor 255 and a current change throttling circuit 260. The current sensor 255 detects changes in the current consumption level. The current sensor 255 may operate by taking periodic samples or any other method allowing the current sensor 255 to determine a rate of change of current flowing from the power supply 240 and/or to the processor 205.

The current change throttling circuit 260 operates to throttle the current consumed by the processor 205. The current change throttling circuit 260 may utilize a predetermined response which is a function of one or more readings of the initial rate of change in current. For example, the current change throttling circuit may utilize an initially high duty cycle throttle signal which tapers off over a predetermined period of time. The duty cycle and/or the period of time may be selected based on the measured rate of change of current.

Alternatively, the current change throttling circuit 260 may adaptively throttle the processor 205 based on continuing feedback from the current sensor 255. For example, one or more initial measurements may be used to establish an approximate corrective throttling progression; however, by considering later input from the current sensor 255, the current change throttling circuit 260 may continue adjusting the throttling level until a steady state of current consumption is achieved.

Figure 3:
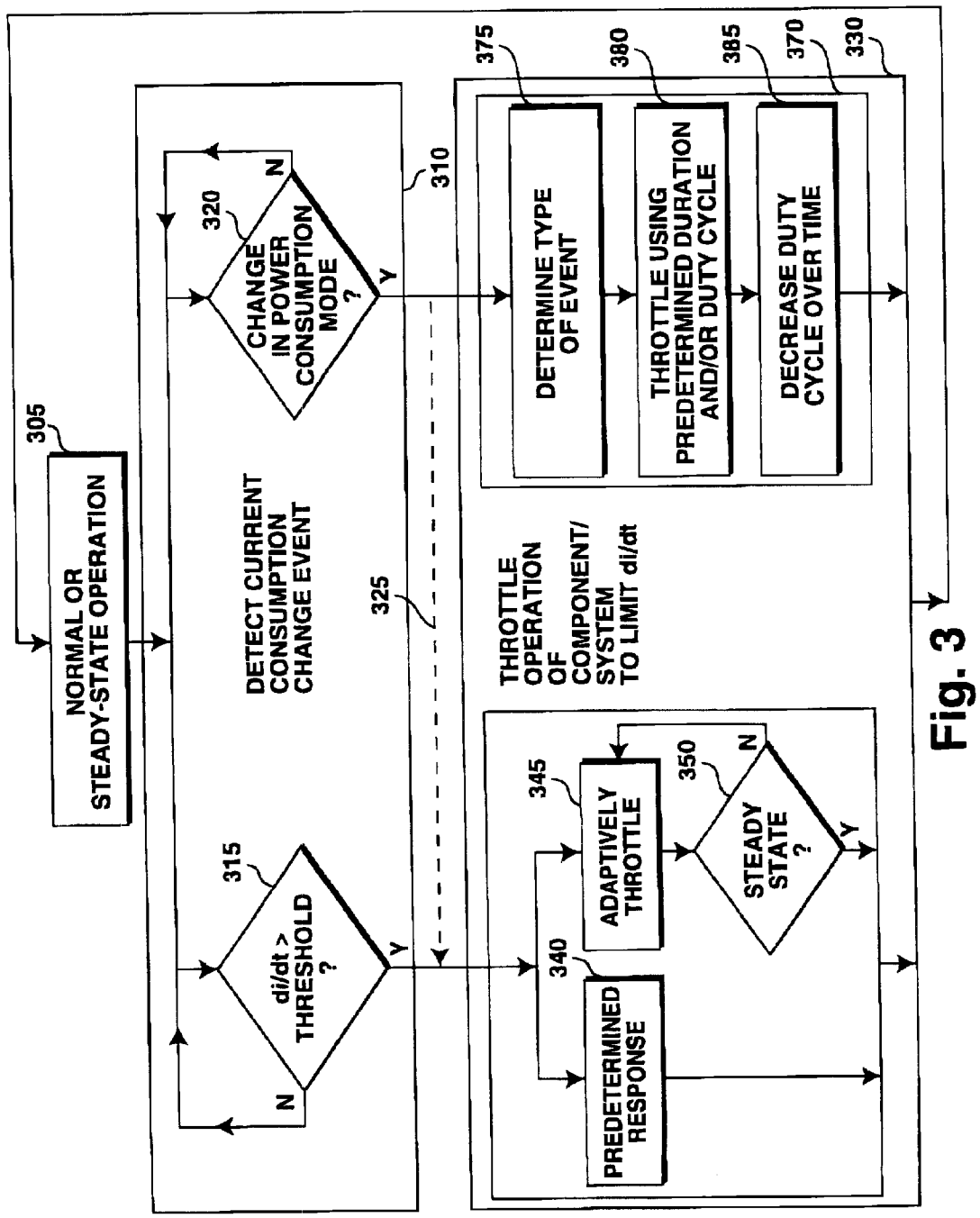
FIG. 3 illustrates a flow diagram for controlling the rate of change of current consumption of an a processing circuit.

FIG. 3 illustrates a method embodying several alternative techniques of controlling the rate of change of current consumption for an electronic component. In block 305, the electronic component operates in a normal or steady state mode. In such a mode, current is not completely uniform, but rather varies moderately depending on the type of processing which occurs. For example, current may increase when an increase in floating point processing occurs.

In block 310, a current consumption change event may be detected. Two examples of such current change event detection are shown in blocks 315 and 320. In block 315, one embodiment senses when the rate of change of current (di/dt) exceeds a threshold or predetermined value. If the rate of change does not exceed the threshold value, the method continues to sense the current level and compare the measured value to the threshold. If the rate of change exceeds the threshold, the method progresses to block 330. One example of an embodiment employing this technique is the system shown in FIG. 2.

In block 320, a current consumption change is recognized when a change in the power consumption mode is detected. This detecting may involve recognizing a stop-break event which ends a stopclock or other system low power state. Since logic external to a component such as a central processor typically controls a number of power management functions, several levels of current rate control may be performed by analyzing power consumption mode information available outside the component for which the rate of change of current is being controlled. Additionally, some embodiments may signal an internal change in the power consumption mode of the component itself as discussed with respect to FIG. 1. Alternatively, any mechanism which detects a change in the rate of current consumption of one or more components may be used in block 310.

In block 330, the operation of the component is Throttled to limit the rate of change of current consumption. Either a transparent throttling function or an existing function such as stopclock may throttle the current consumption. If the detection technique described in block 315 is employed, typically the rate of change of current is throttled using, techniques in block 335 (see, e.g., FIG. 2). If the technique described in block 320 is used, typically the rate of change of current is controlled using techniques shown in block 370. Additionally, as indicated by a dashed line 325, some systems may utilize a combination of techniques (see, e.g., FIG. 4 below) or may use the techniques in block 320 with those in block 335.

In block 340, a predetermined response may be used to control the rate of change of current based on one or more readings of the initial rate of change of current (see also discussion with respect to FIG. 2). Alternatively, adaptive throttling may be used as shown in block 345. Adaptive throttling continues sampling the current and adjusting throttling of the component operation until a steady state is reached as shown in block 350.

In block 370, the system responds to a particular detected power consumption mode change. In block 375, the type of event which occurs is determined. For example, the event may be a user pressing a key while a microprocessor is in a low power state. In block 380, operation of the component is throttled using a predetermined duration of throttling and/or a predetermined duty cycle. In block 385, the duty cycle is decreased over time, meaning that the amount of throttling is reduced as time progresses from the event which caused or signaled the power consumption mode change.

Figure 4:
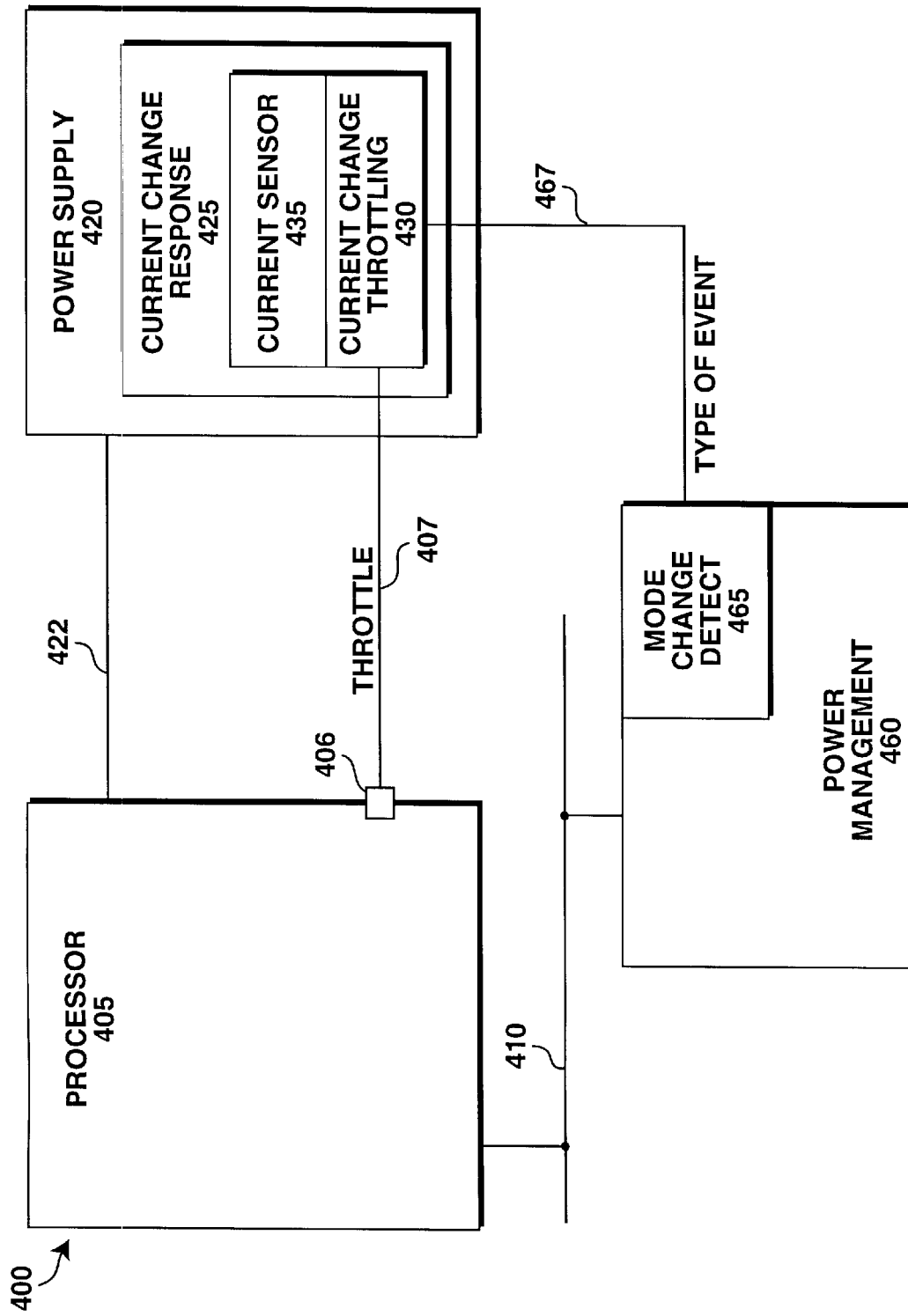
FIG. 4 illustrates an embodiment of a system which utilizes a power supply with current change response circuitry as well as additional power management circuitry.

FIG. 4 illustrates a system 400 which employs both a power management circuit 460 and a power supply 420 with a current change response circuit 425 to throttle processing of a processor 405. In this embodiment, the processor 405 is powered by the power supply 420 over a power line 422. The processor 405 includes a throttle input 406 at which a throttle signal is received via a signal line 407. The processor 405 is coupled to the power management circuit 460 by a bus 410.

As discussed in previous embodiments, the current change response circuit 425 includes a current sensor 435 and a current change throttling circuit 430 which may throttle operations of the processor 405 based on changes in current demand. In addition, this embodiment includes a mode change detect circuit 465 which detects changes in current consumption mode (e.g., by monitoring system events) and passes signals indicating the type of event over one or more signal lines 467 to the current change response circuit 425. As a result, the current response circuit 425 may better predict the magnitude of the change in current in some cases and therefore may more effectively throttle operation of the processor 405 to limit the change in current.

Thus, a method and apparatus for control of the rate of change of current consumption of an electronic component is disclosed. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. An apparatus comprising:
   a processing circuit coupled to receive a throttling signal which throttles operation of the processing circuit; and
   a power management circuit comprising a current sensor which detects a power consumption change of the processing circuit, the power management circuit being coupled to generate the throttling signal which throttles operation of the processing circuit in response to the power consumption change.

2. The apparatus of claim 1 wherein the power management circuit limits a rate of change of current consumption of the processing circuit by throttling operation of the processing circuit in response to the power consumption change.

3. The apparatus of claim 1 wherein the power management circuit asserts and deasserts the throttling signal to slow operation of the processing circuit.

4. The apparatus of claim 3 wherein assertion of the throttling signal slows operation of the processing circuit in a manner functionally transparent to components other than the power management circuit and the processing circuit.

5. The apparatus of claim 3 wherein assertion of the throttling signal slows operation of the processing circuit and wherein the power management circuit asserts and deasserts the throttling signal with a duty cycle which decreases over time, the duty cycle being a percentage of time the throttling signal is asserted.

6. The apparatus of claim 5 wherein the duty cycle decreases to zero over a predetermined duration.

7. The apparatus of claim 6 wherein the predetermined duration is a function of the power consumption change.

8. The apparatus of claim 1 wherein the processing circuit is a processor and assertion of the throttling signal slows a pipeline in the processor.

9. The apparatus of claim 7 wherein assertion of the throttling signal prevents instructions from being retired.

10. The apparatus of claim 1 wherein assertion of the throttling signal prevents instructions from entering the pipeline.

11. The apparatus of claim 1 wherein the throttling signal is a stopclock signal.

12. A power management circuit comprising:
    a power consumption mode change detection circuit for detecting an event which causes a system to change power consumption modes, wherein said event is deassertion of a stopclock signal; and
    a current change throttling circuit coupled to the power consumption mode change detection circuit, the current change throttling circuit asserting a throttling signal to throttle operation of an electronic component in response to deassertion of the stopclock signal.

13. An apparatus comprising:
    a processing circuit coupled to receive a throttling signal which throttles operations of the processing circuit;
    a power supply coupled to provide power to the processing circuit; and
    a current change response circuit which detects a change in current drawn by the processing circuit by measuring the current drawn by the processing circuit and generates the throttling signal to throttle operation of the processing circuit as a function of current drawn by the processing circuit.

14. The apparatus of claim 13 wherein the current change response circuit throttles operation of the processing circuit when a rate of change of current reaches a threshold value.

15. The apparatus of claim 13 wherein the current change response circuit has a predetermined throttling response based on a rate of change of current.

16. The apparatus of claim 13 wherein the current change response circuit adaptively throttles operation of the processing circuit.

17. The apparatus of claim 13 wherein the current change response circuit asserts and deasserts the throttling signal with a duty cycle which decreases over time, the duty cycle being a percentage of time the throttling signal is asserted.

18. A current change response circuit comprising:
    a current sensor which detects a current level from a power supply; and
    a current change throttling circuit coupled to the current sensor and having an output for throttling operation of an electronic component when the current level measured by the current sensor exceeds a threshold value.

19. A method comprising:
    detecting a current consumption change for an electronic component by measuring current drawn by the electronic component; and
    throttling operation of the electronic component to limit a rate of current change in the electronic component in response to detecting the current consumption change.

20. The method of claim 19 wherein detecting comprises:
    sensing a power consumption mode change of a computer system.

21. The method of claim 19 wherein throttling comprises:
    asserting and deasserting a throttling signal having a duty cycle which decreases over time, the duty cycle being a percentage of time which the throttling signal is asserted.

22. The method of claim 19 wherein detecting comprises:
sensing whether the rate of change of current supplied by a power supply is greater than a predetermined level.

23. The method of claim 21 wherein throttling comprises:
applying a predetermined throttling signal which is a function of the rate of change in current supplied.

24. The method of claim 19 wherein the step of throttling comprises:
adaptively throttling operation of the electronic component until power consumption reaches a steady state.

25. The method of claim 19 wherein throttling comprises asserting and deasserting a stopclock signal to limit the current consumption change as the stopclock signal is deasserted the stopclock signal being asserted and deasserted with a decreasing duty cycle of assertion.

* * * * *

UNITED STATES PATENT AND TRADEMARK OFFICE
CERTIFICATE OF CORRECTION

PATENT NO. : 6,304,978 B1
DATED : October 16, 2001
INVENTOR(S) : Horigan et al.

It is certified that error appears in the above-identified patent and that said Letters Patent is hereby corrected as shown below:

Column 1,
Line 32, before "components", insert -- Electronic --.
Line 34, before "stopclock", insert -- a --.

Column 2,
Line 55, after "smaller", insert -- power --.

Column 6,
Line 41, delete "Throttled", insert -- throttled --.

Signed and Sealed this

Eighteenth Day of June, 2002

Attest:

JAMES E. ROGAN
Attesting Officer    Director of the United States Patent and Trademark Office